(12) United States Patent
Zhu (10) Patent No.: US 11,379,065 B2
(45) Date of Patent: Jul. 5, 2022

(54) TOUCH MODULE AND DRIVING METHOD THEREFOR, AND TOUCH DISPLAY DEVICE

(71) Applicants: Chengdu BOE Optoelectronics Technology Co., Ltd., Chengdu (CN); BOE Technology Group Co., Ltd., Beijing (CN)

(72) Inventor: Yuanzhang Zhu, Beijing (CN)

(73) Assignees: Chengdu BOE Optoelectronics Technology Co., Ltd., Chengdu (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/048,308

(22) PCT Filed: Mar. 20, 2020

(86) PCT No.: PCT/CN2020/080493
§ 371 (c)(1),
(2) Date: Oct. 16, 2020

(87) PCT Pub. No.: WO2020/192591
PCT Pub. Date: Oct. 1, 2020

(65) Prior Publication Data
US 2021/0149512 A1    May 20, 2021

(30) Foreign Application Priority Data
Mar. 26, 2019   (CN) .......................... 201910232119.4

(51) Int. Cl.
*G06F 3/041*    (2006.01)
*G09G 3/20*     (2006.01)

(52) U.S. Cl.
CPC ......... *G06F 3/0412* (2013.01); *G09G 3/2092* (2013.01); *G09G 2310/08* (2013.01)

(58) Field of Classification Search
CPC .. G06F 3/0412; G06F 3/0416; G06F 3/04164; G06F 3/04166; G09G 2310/08; G09G 3/2092
See application file for complete search history.

(56) References Cited

U.S. PATENT DOCUMENTS

2014/0375907 A1* 12/2014 Wu ..................... G06F 3/04164
349/12
2015/0029413 A1*  1/2015 Chang ................. G06F 3/04164
349/12

(Continued)

FOREIGN PATENT DOCUMENTS

CN       104699315 A     6/2015
CN       104765501 A     7/2015

(Continued)

OTHER PUBLICATIONS

CN201910232119.4 OA1.

*Primary Examiner* — Hong Zhou
(74) *Attorney, Agent, or Firm* — IPro, PLLC (57) ABSTRACT

Disclosed by the present disclosure are a touch module and a driving method therefor, and a touch display device. The touch module has a touch area and a non-touch area. The touch module comprises: touch signal lines extending from the touch area to the non-touch area, and n data selection units connected to the touch signal lines extending to the non-touch area; each data selection unit is connected to m touch signal lines; each of the data selection units comprise m switching transistors and one data selection line, each switching transistor is in one to one correspondence with one touch signal line, control terminals of the switching transistors are connected to level signal lines that provide time-sharing driving level signals respectively, first terminals of the switching transistors are connected to corresponding touch signal lines respectively, and second termi- (Continued)

nals of the switching transistors are each connected to the data selection lines.

8 Claims, 5 Drawing Sheets

(56) References Cited

U.S. PATENT DOCUMENTS

| | | | |
|---|---|---|---|
| 2016/0291784 A1 | 10/2016 | Zhai | |
| 2017/0192558 A1* | 7/2017 | Xi | G06F 3/0412 |
| 2017/0255330 A1* | 9/2017 | Miyamoto | H01L 27/3262 |
| 2018/0047316 A1 | 2/2018 | Zhou et al. | |
| 2018/0307368 A1* | 10/2018 | Koide | G06F 3/04164 |
| 2018/0321766 A1* | 11/2018 | Akimoto | G06F 3/04164 |
| 2018/0364857 A1* | 12/2018 | Lai | G06F 3/04164 |
| 2020/0219941 A1* | 7/2020 | Chiang | H01L 51/5256 |

FOREIGN PATENT DOCUMENTS

| | | |
|---|---|---|
| CN | 106406623 A | 2/2017 |
| CN | 106775126 A | 5/2017 |
| CN | 206147579 U | 5/2017 |
| CN | 107092151 A | 8/2017 |
| CN | 206515586 U | 9/2017 |
| CN | 107463295 A | 12/2017 |
| CN | 109901752 A | 6/2019 |
| JP | 2017199311 A | 11/2017 |

\* cited by examiner

> providing time-division drive level signals for the level signal lines to control the switching transistors in each data selection unit to be turned on in turn, so that the data selection lines are sequentially connected with the touch signal lines ⸺ S301

TOUCH MODULE AND DRIVING METHOD THEREFOR, AND TOUCH DISPLAY DEVICE

CROSS REFERENCE TO RELATED APPLICATIONS

The application is a National Stage of International Application No. PCT/CN2020/080493, filed on Mar. 20, 2020, which claims the priority of a Chinese patent application filed in the Chinese Patent Office on Mar. 26, 2019 with the application number 201910232119.4 and application name "Touch module, Driving Method thereof and Touch Display Device", the entire contents of which are hereby incorporated by reference.

FIELD

The disclosure relates to the technical field of touch control, in particular to a touch module, a driving method thereof and a touch display device.

BACKGROUND

With the development of display technology, more and more display products have a touch control function. Generally, touch control lines in a touch display screen include transmission signal lines (Tx) and reception signal lines (Rx). Because of the large number of the transmission signal lines and reception signal lines, taking mobile phones as an example, there are generally no less than 16 Tx and no less than 32 Rx, the remaining input/output (I/O) ports of a main IC in the touch display screen are not enough to reprocess the signals transmitted by Tx and Rx, so it is necessary to provide an additional drive chip connected with Tx and Rx.

SUMMARY

Some embodiments of the disclosure provide a touch module, wherein the touch module includes a touch area and a non-touch area, touch signal lines extending from the touch area to the non-touch area and n data selection circuits connected with the touch signal lines;

each data selection circuit is connected with m touch control signal lines, m and n are positive integers, and m is greater than or equal to 2; and each data selection circuit includes m switching transistors and a data selection line, wherein the switching transistors are in one-to-one correspondence to the touch signal lines, a control terminal of each switching transistor is connected with a level signal line providing time-division drive level signals, a first terminal of each switching transistor is connected with the corresponding touch signal line, and a second terminal of each switching transistor is connected with the data selection line.

Optionally, in the touch module provided by some embodiments of the disclosure, the touch signal lines include transmission signal lines and reception signal lines, and the transmission signal lines and/or the reception signal lines are connected with the data selection circuits.

Optionally, in the touch module provided by some embodiments of the disclosure, all the switching transistors are N-type transistors or P-type transistors.

Optionally, in the touch module provided by some embodiments of the disclosure, different switching transistors in each same data selection circuit are connected with different level signal lines, and the m-th switching transistor in each data selection circuit is connected with the m-th level signal line.

Some embodiments of the disclosure provide a touch display device including a display panel, the touch module provided by above embodiments of the disclosure, and a drive chip for driving the display panel and the touch module, wherein the drive chip is connected with the data selection lines.

Optionally, the touch display device provided by some embodiments of the disclosure further includes a flexible printed circuit board;

both the data selection circuits and the drive chip are located in a bezel area of the display panel; and the touch signal lines are connected with the first terminals of the switching transistors in the data selection circuits through the flexible printed circuit board.

Optionally, in the touch display device provided by some embodiments of the disclosure, the flexible printed circuit boards include a flexible touch printed circuit board and a flexible display printed circuit board; and the touch signal lines are sequentially connected with the first terminals of the switching transistors in the data selection circuits through the flexible touch printed circuit board and the flexible display printed circuit board.

Optionally, in the touch display device provided by some embodiments of the disclosure, films in the switching transistors in the data selection circuits and a film in a transistor in the display panel are arranged on the same layer, wherein the films includes a function same as that of the film.

Some embodiments of the disclosure further provide a driving method of the touch module, wherein the method includes:

providing time-division drive level signals to the level signal lines, and controlling the switching transistors in each data selection circuit to be turned on in turn based on the time-division drive level signals, so that the data selection lines are sequentially connected with the touch signal lines.

Optionally, in the driving method provided by some embodiments of the disclosure, a frequency of the time-division level signals is m times a frequency of touch signals transmitted by the touch signal lines.

BRIEF DESCRIPTION OF THE DRAWINGS

In order to explain the technical solution in the embodiments of the disclosure more clearly, the drawings used in the description of the embodiments will be briefly introduced below. Obviously, the drawings in the following description are only some embodiments of the disclosure, and for those of ordinary skill in the art, other drawings can be obtained according to these drawings without paying creative labor.

DETAILED DESCRIPTION OF THE EMBODIMENTS

Figure 1:
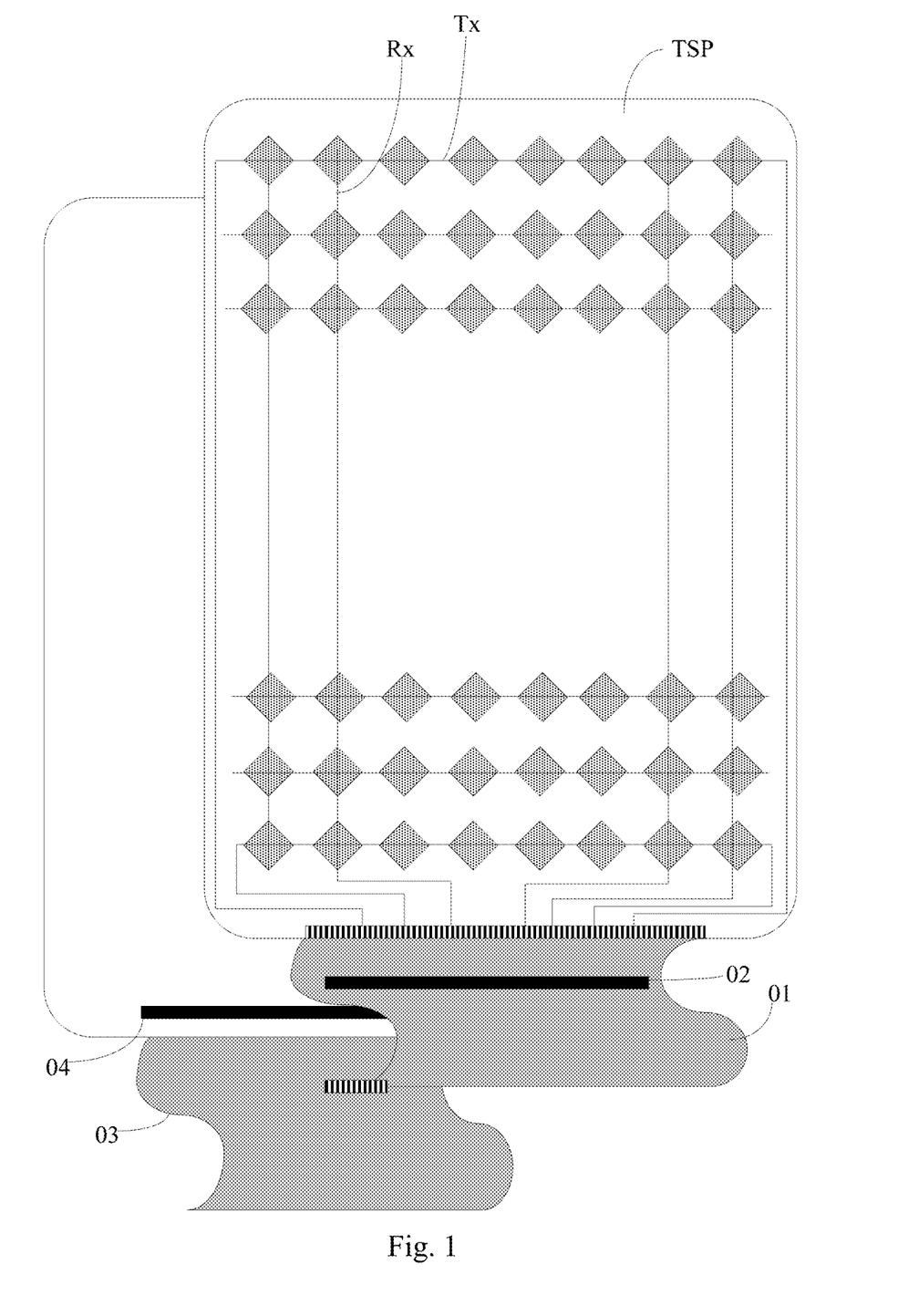
FIG. 1 is a structural diagram of a touch display screen in the related art.

In the related art, because the remaining input/output (I/O) ports of a main IC in a touch display screen are not enough to process the signals transmitted by Tx and Rx, it is necessary to provide an additional drive chip connected with Tx and Rx. Specifically, as shown in FIG. 1, the transmission signal lines Tx and the reception signal lines Rx converge to a stepped area on a touch screen panel (TSP) of the touch display screen, and then are led out to an IC 02 of the TSP through a flexible printed circuit (FPC) 01 of the TSP for signal processing, and then the processed touch information is transferred to the main IC 04 via a FPC 03 through the FPC 01 of the TSP for touch position determination.

In the related art mentioned above, due to the large number of the transmission signal lines and reception signal lines and the limitation of the number of the remaining I/O ports of the main IC, it is necessary to add a TSP IC, which leads to an increase in the production cost of touch display products, increases the risk of poor IC bonding and affects the touch yield.

In view of this, some embodiments of the disclosure provide a touch module, a driving method thereof and a touch display device.

In order to make the above objectives, features and advantages of the disclosure more obvious and understandable, the disclosure will be further explained with reference to the drawings and embodiments. However, the exemplary embodiments can be implemented in many forms and should not be construed as limited to the implementation modes set forth herein; on the contrary, these embodiments are provided to make this disclosure more thorough and complete, and to fully convey the concept of exemplary embodiments to those skilled in the art. In the drawings, the same reference numerals denote the same or similar structures, and thus repeated descriptions thereof will be omitted. The words representing position and direction described in this disclosure are all illustrated with the attached drawings as an example, but they can be changed as needed, and all the changes are included in the protection scope of this disclosure. The drawings of this disclosure are only used to illustrate the relative positional relationship, and do not represent the true scale.

It should be noted that in the following description, specific details are set forth in order to fully understand the disclosure. However, this disclosure can be implemented in many other ways different from those described here, and those skilled in the art can make similar extension without violating the connotation of this disclosure. Therefore, the disclosure is not limited by the specific embodiments disclosed below. The specification will describe the preferred embodiments for implementing this disclosure. However, the description is for the purpose of explaining the general principles of this disclosure, and is not intended to limit the scope of this disclosure. The scope of protection of this disclosure shall be as defined by the appended claims.

With reference to the drawings, the touch module, the driving method thereof and the touch display device provided by embodiments of the disclosure will be described in detail below.

Figure 2:
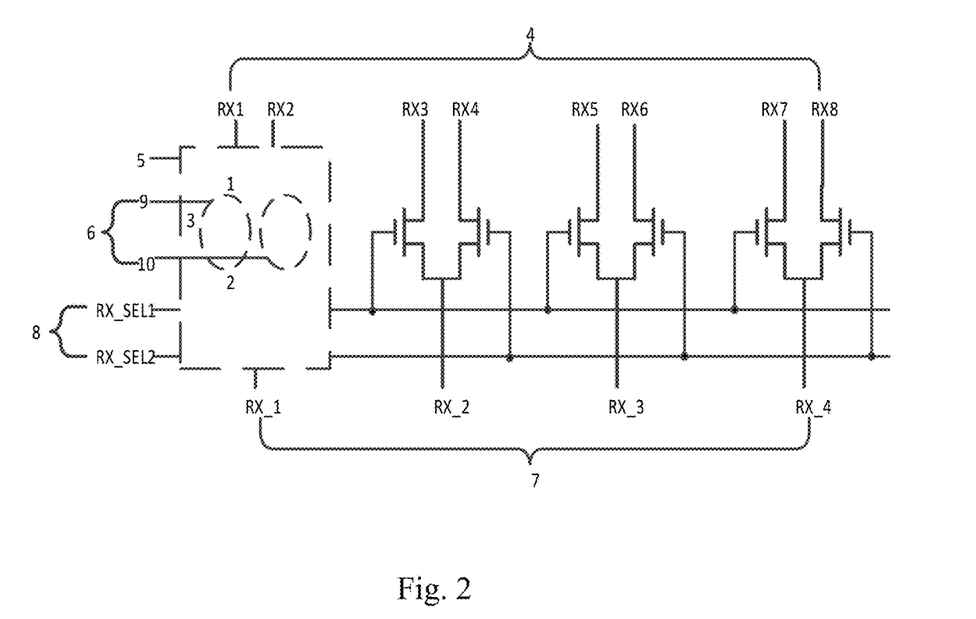
FIG. 2 is a diagram of a touch module provided by an embodiment of the disclosure.

The touch module provided by some embodiments of the disclosure is provided with a touch area and a non-touch area. As shown in FIG. 2, the touch module includes touch signal lines 4 extending from the touch area to the non-touch area and n data selection circuits 5 connected with the touch signal lines 4 extending to the non-touch area.

Each data selection circuit 5 is connected with m touch control signal lines 4, m and n are positive integers, and m is greater than or equal to 2.

Each data selection circuit 5 includes m switching transistors 6 and a data selection line 7, wherein the switching transistors 6 are in one-to-one correspondence to the touch signal lines 4, a control terminal 3 of each switching transistor 6 is connected with a level signal line 8 providing time-division drive level signals, a first terminal 1 of each switching transistor 6 is connected with the corresponding touch signal line 4, and a second terminal 2 of each switching transistor 6 is connected with the data selection line 7.

The touch module provided by some embodiments of the disclosure is provided with the data selection circuits, each of which is connected with a plurality of touch signal lines, and each data selection circuit includes the switching transistors connected with the touch signal lines in one-to-one correspondence and the data selection line. Because the control terminal of each switching transistor is connected with the corresponding level signal line providing the time-division drive level signals, the switching transistors in each data selection circuit can be controlled to be turned on in turn under the control of the time-division drive level signals, so that the touch signal lines are connected with the data selection lines in turn and transmit signals to the data selection lines in turn. In addition, because a plurality of touch signal lines are connected to one data selection line through the switching transistors, the total number of the data selection lines in the touch module is less than the total number of the touch signal lines, thereby reducing the number of ports required for data transmission between a drive chip and the touch module. Furthermore, when the touch module is applied to display products, there is no need to additionally set a drive chip for driving the touch module, so that the production cost can be reduced.

Optionally, in the touch module provided by some embodiments of the disclosure, the touch signal lines include transmission signal lines (TX) and reception signal lines (RX), and the transmission signal lines and/or the reception signal lines are connected with the data selection circuits.

In the touch module provided by some embodiments of the disclosure, whether it is TX or RX which is connected with the data selection circuits, the number of leads for data transmission between the touch module and the drive chip driving the touch module is less than the number of the touch signal lines, thereby reducing the number of ports of the drive chip driving the touch module. Of course, when both TX and RX are connected with the data selection circuits, the number of leads for data transmission between the touch module and the drive chip driving the touch module can be further reduced, and the number of ports required for data transmission between the drive chip and the touch module can be reduced.

It should be noted that the touch module shown in FIG. 2 provided by some embodiments of the disclosure is exemplified by assuming that eight data signal lines are connected with four data selection circuits and each data selection circuit is connected with two touch signal lines, that is, n=4 and m=2. Of course, the number of the data signal lines, the number of the data selection circuits, and the number of the data signal lines connected to each data selection circuit can be selected according to actual needs, which is not limited by the disclosure. In FIG. 2, the touch signal lines 4 are RX, but of course, the touch signal lines 4 can also be TX.

Optionally, in the touch module provided by some embodiments of the disclosure, the switching transistor may be a thin film transistor or a metal-oxide-semiconductor (MOS) field effect transistor, which is not limited here.

Optionally, in the touch module provided by some embodiments of the disclosure, all the switching transistors are N-type transistors or P-type transistors, so that all the switching transistors can be prepared with the same preparation process, thereby reducing the process steps and saving the production cost.

In some embodiments, if the switching transistors are N-type transistors, high-level signals are provided by the level signal lines to turn on the switching transistors. If the switching transistors are P-type transistors, low-level signals are provided by the level signal lines to turn on the switching transistors.

Optionally, in the touch module provided by some embodiments of the disclosure, as shown in FIG. 2, different switching transistors in the same data selection circuit 5 are connected with different level signal lines and the m-th switching transistor in each data selection circuit is connected with the m-th level signal line. That is, different data selection circuits 5 share the level signal lines, so that the number of the level signal lines can be reduced.

In some embodiments, taking m=2 as an example, as shown in FIG. 2, each data selection circuit 5 includes a first switching transistor 9 and a second switching transistor 10, the first switching transistors 9 of different data selection circuits 5 are connected to the same first level signal line RX_SEL1, and the second switching transistors 10 of different data selection circuits 5 are connected to the same second level signal line RX_SEL2.

According to the touch module provided by some embodiments of the disclosure, each data selection circuit is connected with m adjacent touch signal lines. In the touch module shown in FIG. 2, RX1 and RX2 are connected to the same data selection circuit, RX3 and RX4 are connected to the same data selection circuit, RX5 and RX6 are connected to the same data selection circuit, and RX7 and RX8 are connected to the same data selection circuit, so that the number of the data selection lines in the data selection circuits connected to RX is half that of RX. The control terminal 3 of the first switching transistor 9 connected to RX1, RX3, RX5 and RX7 is connected to the first level signal line RX_SEL1, and the control terminal 3 of the second switching transistor 10 connected to RX2, RX4, RX6 and RX8 is connected to the second level signal line RX_SEL2. The time-division drive signals are provided by the first level signal line RX_SEL1 and the second level signal line RX_SEL2 to control the first switching transistor and the second switching transistor to be turned on in turn. That is, when the first switching transistor is turned on, the second switching transistor is turned off, and when the second switching transistor is turned on, the first switching transistor is turned off. When the first switching transistor is turned on and the second switching transistor is turned off, RX1 is connected with the data selection line RX_1 and signals of RX1 are output from the data selection line RX_1, RX3 is connected with the data selection line RX_2 and signals of RX3 are output from the data selection line RX_2, RX5 is connected with the data selection line RX_3 and signals of RX5 are output from the data selection line RX_3, RX7 is connected with the data selection line RX_4 and signals of RX7 are output from the data selection line RX_4. When the second switching transistor is turned on and the first switching transistor is turned off, RX2 is connected with the data selection line RX_1 and signals of RX2 are output from the data selection line RX_1, RX4 is connected with the data selection line RX_2 and signals of RX4 are output from the data selection line RX_2, RX6 is connected with the data selection line RX_3 and signals of RX6 are output from the data selection line RX_3, RX8 is connected with the data selection line RX_4 and signals of RX8 are output from the data selection line RX_4.

If TX is connected with the data selection circuits, still assuming that one data selection circuit is connected with two TX, RX in the touch module as shown in FIG. 2 provided by the embodiments of the disclosure can be replaced by TX, and then time-division drive signals are provided by the first level signal line RX_SEL1 and the second level signal line RX_SEL2 to control the first switching transistor and the second switching transistor to be turned on in turn, so that different TX in one data selection circuit are connected with the data selection lines in turn, so that different TX can transmit data with the data selection lines in turn.

In FIG. 2, it is assumed that each data selection circuit is connected with two touch signal lines. Of course, each data selection circuit can also be connected with more touch signal lines. In the n data selection circuits, each data selection circuit is connected with m touch control signal lines, that is, each data selection circuit includes m switching transistors. Optionally, the n data selection circuits are all connected with the m level signal lines, and the m switching transistors in each data selection circuit are connected with the m level signal lines respectively.

Optionally, when driving the touch module, the frequency of the level signals of each level signal line is m times the frequency of touch signals transmitted by the touch signal lines.

For example, when each data selection circuit is connected with two touch signal lines, the frequency of the level signals of each level signal line is twice the frequency of touch signals transmitted by the touch signal lines. In this way, it can be ensured that the signals on different touch signal lines output through the same data selection line do not overlap, thus guaranteeing the accuracy of touch control.

Optionally, when driving the touch module, the level signals of different level signal lines have the same amplitude but different phases.

Figure 3:
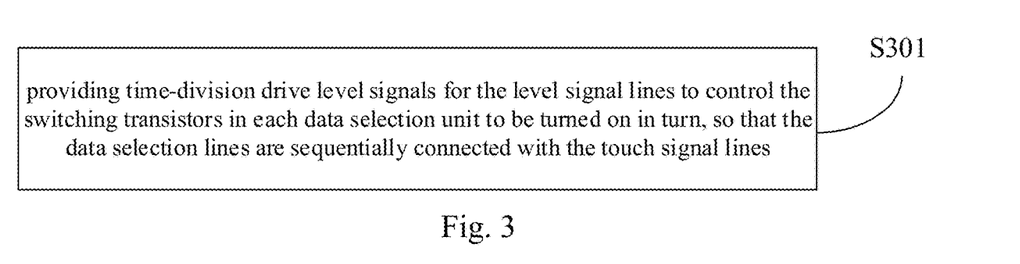
FIG. 3 is a flowchart of a driving method of a touch module according to an embodiment of the disclosure.

Based on the same inventive concept, some embodiments of the disclosure further provide a driving method of the above touch module, as shown in FIG. 3, the method includes:

S301, providing time-division drive level signals for the level signal lines, to control the switching transistors in each data selection circuit to be turned on in turn, so that the data selection lines are sequentially connected with the touch signal lines.

Optionally, in the driving method provided by some embodiments of the disclosure, the providing the time-division drive level signals for the level signal lines includes:

providing level signals of which frequency is m times the frequency of the touch signals transmitted by the touch signal lines to each level signal line.

Optionally, in the driving method provided by some embodiments of the disclosure, the step of providing the time-division drive level signals for the level signal lines further includes: providing level signals with the same amplitude but different phases to different level signal lines.

Figure 4:
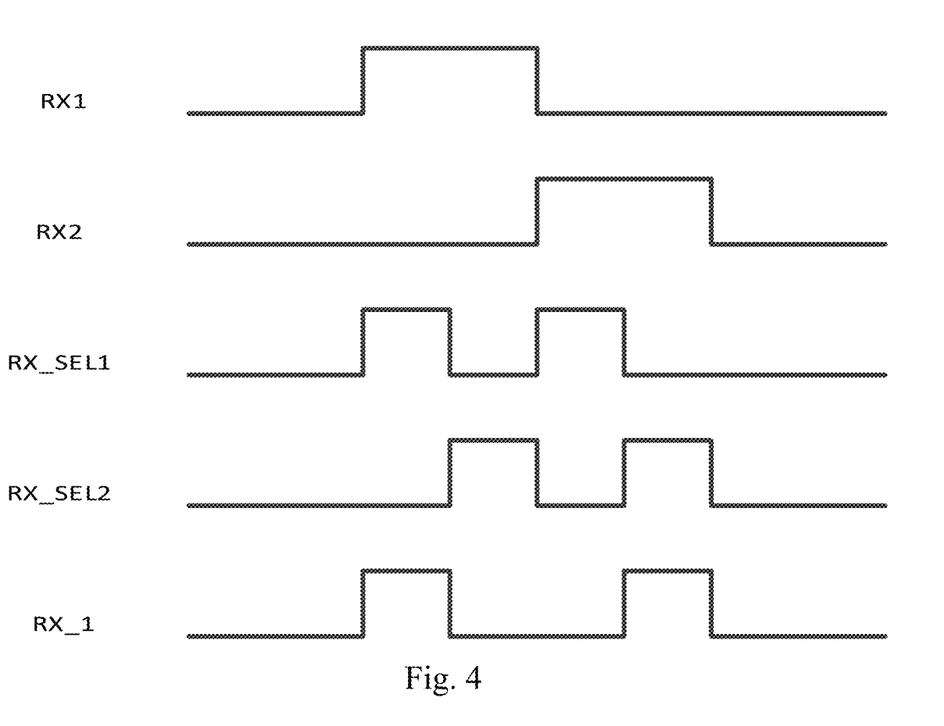
FIG. 4 is a circuit timing diagram of a touch module provided by an embodiment of the disclosure.

In some embodiments, assuming that RX is connected to the data selection circuits and the switching transistors are NMOS transistors, the driving method of the touch module provided by some embodiments of the disclosure will be explained with reference to a circuit timing diagram of a data selection circuit provided in FIG. 4. Under the control of the time-division drive signals, when RX_SEL1 is at a high level, RX_SEL2 is at a low level, the first switching transistor 9 connected with RX_1 is turned on, the second switching transistor 10 connected with RX_2 is turned off, RX1 is connected with the data selection line RX_1, and RX_1 outputs signals of RX1. When RX_SEL2 is at a high level, RX_SEL1 is at a low level, the first switching transistor 9 connected with RX_1 is turned off, RX2 is connected with the data selection line RX_1, the second switching transistor 10 connected with RX_2 is turned on, and RX_1 outputs signals of RX2. The data selection lines are connected with a touch chip (IC) driving the touch module, so that after receiving the RX signals output by the data selection lines, the IC can obtain the timing sequence of different RX by an algorithm. For example, the actual signals of RX1 and RX2 can be obtained after the time sequence of RX_1 in FIG. 2 is processed by the algorithm, which will not affect the reception of RX signals by the IC, and can realize normal touch function.

Figure 5:
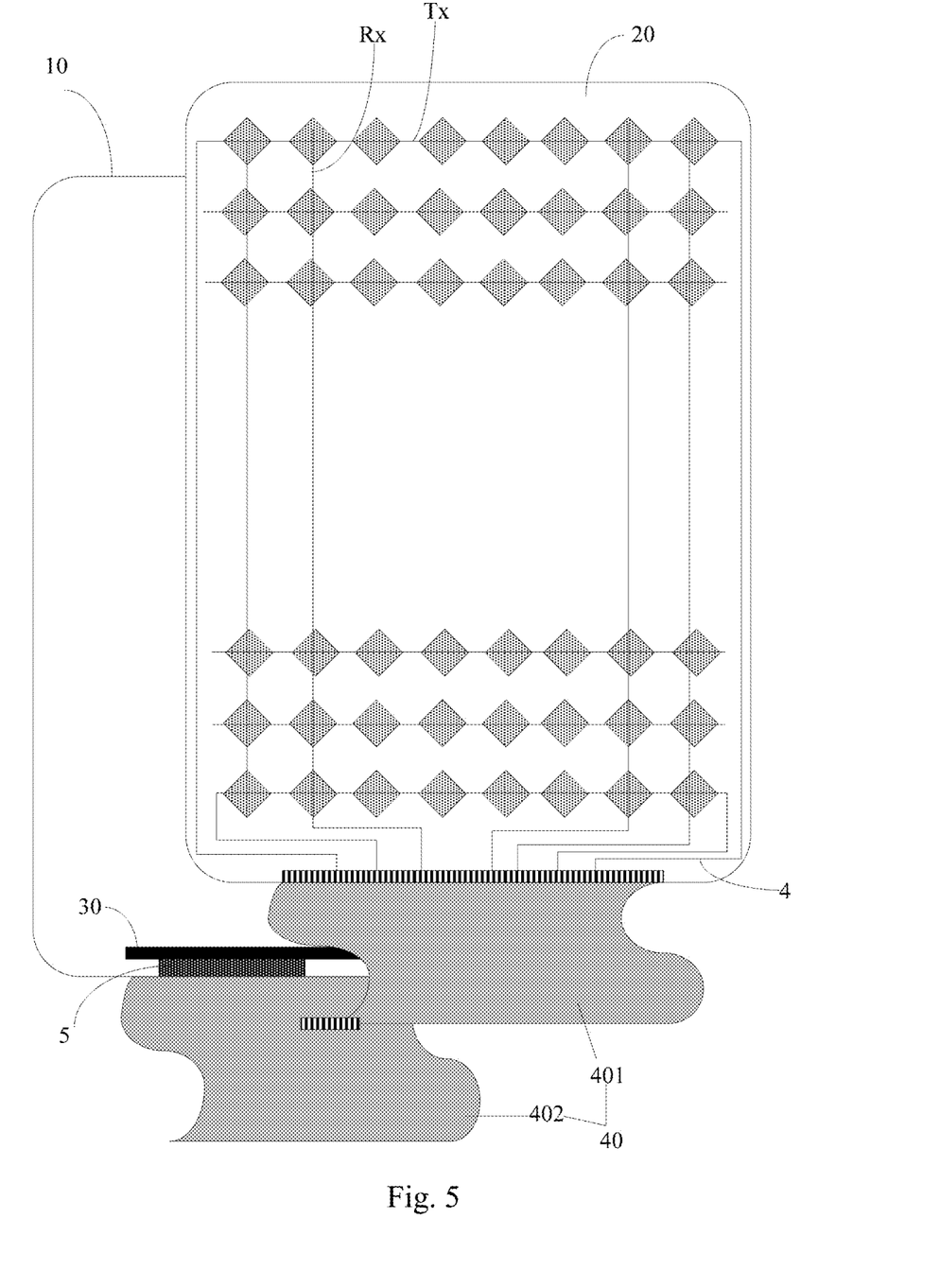
FIG. 5 is a structural diagram of a touch display device provided by an embodiment of the disclosure.

Based on the same inventive concept, some embodiments of the disclosure further provide a touch display device, as shown in FIG. 5, including a display panel 10, the touch module 20 provided by some embodiments of the disclosure, and a drive chip 30 for driving the display panel 10 and the touch module 20, wherein the drive chip 30 is connected with the data selection lines (not shown in FIG. 5).

The touch display device provided by some embodiments of the disclosure includes the touch module provided by embodiments of the disclosure, and the data selection lines are connected with the drive chip. Since the number of the data selection lines is less than the number of the touch signal lines, the number of leads connected with the drive chip is less than the number of the touch signal lines, thus greatly reducing the number of ports of the drive chip connected with the touch module. Therefore, the number of remaining ports of the drive chip driving the display panel is sufficient to drive the touch module, so that it is unnecessary to arrange an additional drive chip driving the touch module, thus reducing the production cost of the touch display device and avoiding the risk of poor bonding caused by the extra setting of the drive chip driving the touch module.

Figure 6:
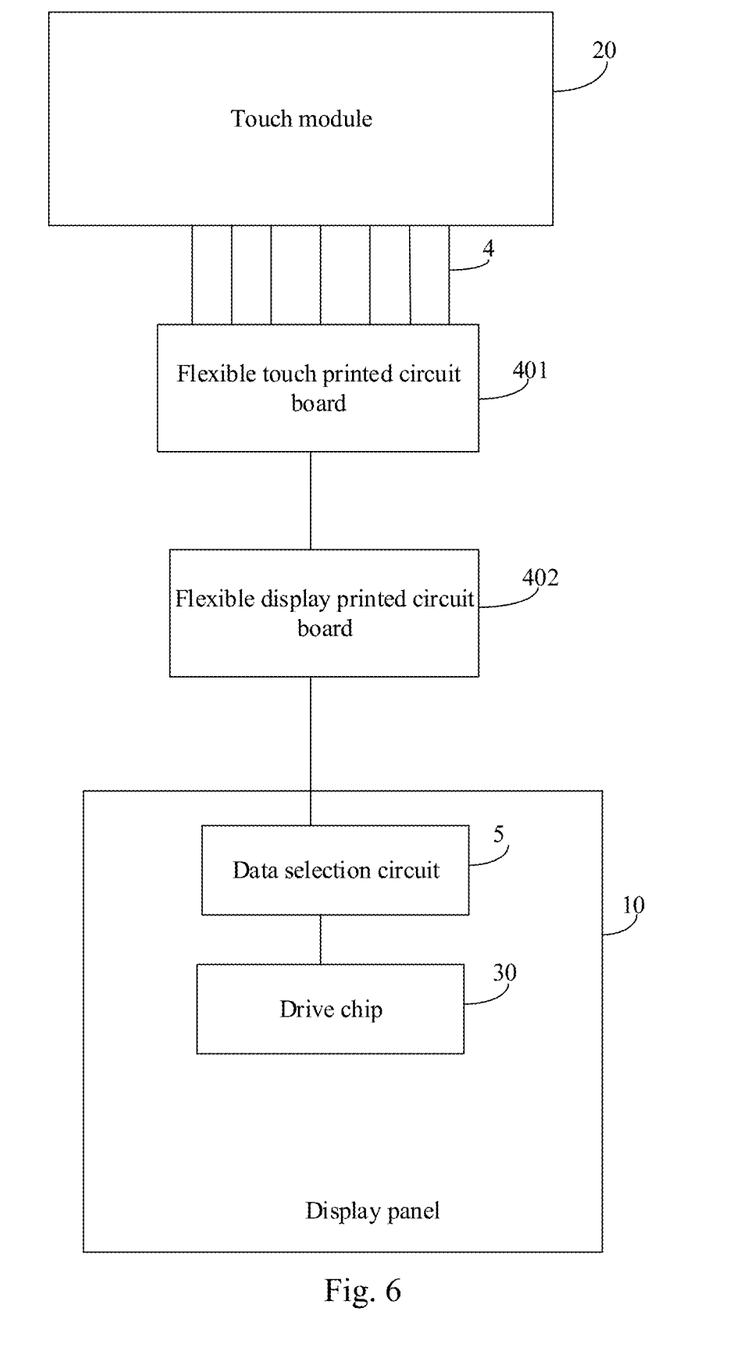
FIG. 6 is another structural diagram of a touch display device provided by an embodiment of the disclosure.

Optionally, as shown in FIG. 5 and FIG. 6, the touch display device provided by some embodiments of the disclosure further includes a flexible printed circuit board 40.

Both the data selection circuits 5 and the drive chip 30 are located in a bezel area of the display panel 10; and the touch signal lines are connected with the first terminals of the switching transistors in the data selection circuits 5 through the flexible printed circuit board 40.

Optionally, in the touch display device provided by some embodiments of the disclosure, as shown in FIG. 5, the flexible printed circuit board 40 include a flexible touch printed circuit board 401 and a flexible display printed circuit board 402.

The touch signal lines 4 are sequentially connected with the first terminals of the switching transistors in the data selection circuits 5 through the flexible touch printed circuit board 401 and the flexible display printed circuit board 402.

In the touch display device provided by some embodiments of the disclosure, the touch module can be located on the display panel to form an on cell touch screen, the touch area of the touch module is provided with touch electrodes, and the touch signal lines are connected with the touch electrodes and extend from the touch area to the non-touch area, and are connected to the flexible display printed circuit board of the display panel via the flexible touch printed circuit board, and then connected with the drive chip via the data selection circuits.

Optionally, in the touch display device provided by some embodiments of the disclosure, films in the switching transistors in the data selection circuits with the same function as a film in a transistor in the display panel are arranged on the same layer. In this way, the switching transistors in the data selection circuits are formed while the transistor of the display panel is manufactured, so that the process of manufacturing the switching transistors in the data selection circuits separately is omitted, and the production cost can be reduced.

Optionally, in the touch display device provided by some embodiments of the disclosure, the level signal lines are connected with the drive chip.

That is, the drive chip provides time-division drive signals for the data selection circuits, and controls the switching transistors to be turned on in turn in the touch phase.

Optionally, in the display stage, the drive chip provides ground signals for the level signal lines, so that the risk of electrostatic discharge can be avoided.

In the touch display device provided by some embodiments of the disclosure, the display panel may be, for example, an organic light-emitting diode (OLED) display panel.

The touch display device provided by some embodiments of the disclosure may be, for example, a mobile phone, a tablet computer, and the like.

According to the touch module, the driving method thereof and the touch display device provided by some embodiments of the disclosure, the touch module is provided with the data selection circuits, each of which is connected with a plurality of touch signal lines, and each data selection circuit includes the switching transistors connected with the touch signal lines in one-to-one correspondence and the data selection line. Because the control terminal of each switching transistor is connected with the corresponding level signal line providing the time-division drive level signals, the switching transistors in each data selection circuit can be controlled to be turned on in turn under the control of the time-division drive level signals, so that the touch signal lines are connected with the data selection lines in turn and transmit signals to the data selection lines in turn. In addition, because a plurality of touch signal lines are connected to one data selection line through the switching transistors, the total number of the data selection lines in the touch module is less than the total number of the touch signal lines, thereby reducing the number of ports required for data transmission between a drive chip and the touch module. Furthermore, when the touch module is applied to display products, there is no need to additionally set a drive chip for driving the touch module, so that the production cost can be reduced.

Obviously, those skilled in the art can make various changes and modifications to the disclosure without departing from the spirit and scope of the disclosure. Thus, the disclosure is also intended to include such modifications and variations if they fall within the scope of the claims of the disclosure and their equivalents.

What is claimed is:

1. A touch display device, comprising a display panel, a touch module, and a drive chip for driving the display panel and the touch module, the drive chip being connected with the data selection lines;
   wherein the touch module comprises a touch area and a non-touch area, touch signal lines extending from the touch area to the non-touch area and n data selection circuits connected with the touch signal lines; each data selection circuit is connected with m touch control signal lines, m and n are positive integers, and m is greater than or equal to 2; and each data selection circuit comprises m switching transistors and a data selection line, wherein the switching transistors are in one-to-one correspondence to the touch signal lines, a control terminal of each switching transistor is connected with a level signal line providing time-division drive level signals, a first terminal of each switching transistor is connected with corresponding touch signal line, and a second terminal of each switching transistor is connected with the data selection line; and
   the touch display device further comprises a flexible printed circuit board, the data selection circuits and the drive chip are located in a bezel area of the display panel; and the touch signal lines are connected with the first terminals of the switching transistors in the data selection circuits through the flexible printed circuit board.

2. The touch display device according to claim 1, wherein the flexible printed circuit board comprise a flexible touch printed circuit board and a flexible display printed circuit board; and
   the touch signal lines are sequentially connected with the first terminals of the switching transistors in the data selection circuits through the flexible touch printed circuit board and the flexible display printed circuit board.

3. The touch display device according to claim 1, wherein films in the switching transistors in the data selection circuits and a film in a transistor in the display panel are arranged on a same layer, wherein the films includes a function same as that of the film.

4. A driving method of the touch display device according to claim 1, the method comprises:
   providing time-division drive level signals to the level signal lines, and controlling the switching transistors in each data selection circuit to be turned on in turn based the time-division drive, so that the data selection lines are sequentially connected with the touch signal lines.

5. The driving method according to claim 4, wherein
   a frequency of the time-division level signals is m times a frequency of touch signals transmitted by the touch signal lines.

6. The touch display device according to claim 1, wherein the touch signal lines comprise transmission signal lines and reception signal lines, and the transmission signal lines and/or the reception signal lines are connected with the data selection circuits.

7. The touch display device according to claim 1, wherein all the switching transistors are N-type transistors or P-type transistors.

8. The touch display device according to claim 7, wherein different switching transistors in each data selection circuit are connected with different level signal lines, and an m-th switching transistor in each data selection circuit is connected with an m-th level signal line.

* * * * *